US010146466B1

(12) United States Patent
Puhov et al.

(10) Patent No.: US 10,146,466 B1
(45) Date of Patent: Dec. 4, 2018

(54) MERGING MAPPING METADATA TO PROMOTE REFERENCE COUNTING EFFICIENCY

(71) Applicant: EMC IP Holding Company LLC, Hopkinton, MA (US)

(72) Inventors: Peter Puhov, Shrewsbury, MA (US); Richard P. Ruef, Santa Cruz, CA (US); William C. Davenport, San Diego, CA (US); Lili Chen, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 15/499,488

(22) Filed: Apr. 27, 2017

(51) Int. Cl.
G06F 3/06 (2006.01)

(52) U.S. Cl.
CPC ............ G06F 3/064 (2013.01); G06F 3/0604 (2013.01); G06F 3/0673 (2013.01)

(58) Field of Classification Search
CPC ....... G06F 3/064; G06F 3/0604; G06F 3/0673
See application file for complete search history.

(56) References Cited

U.S. PATENT DOCUMENTS

| 8,032,498 | B1 | 10/2011 | Armangau et al. |
| 8,412,688 | B1 | 4/2013 | Armangau et al. |
| 8,457,018 | B1 | 6/2013 | Ruef et al. |
| 9,569,356 | B1 | 2/2017 | Wei et al. |
| 9,696,919 | B1 | 7/2017 | Vankamamidi et al. |
| 2010/0077013 | A1* | 3/2010 | Clements .......... G06F 17/30156 707/822 |
| 2011/0161381 | A1* | 6/2011 | Wang ................ G06F 17/30088 707/814 |

OTHER PUBLICATIONS

Philippe Armangau, et al.; "Efficiently Managing Reference Weights for Write Splits," U.S. Appl. No. 15/086,629, filed Mar. 31, 2016.

* cited by examiner

*Primary Examiner* — Reginald G Bragdon
*Assistant Examiner* — Edward Wang
(74) *Attorney, Agent, or Firm* — BainwoodHuang

(57) ABSTRACT

A technique for managing metadata in a data storage system designates block pointers as either sources or copies, where sources contribute to reference counts of pointed-to structures but copies do not. The technique maintains parent-child relationships between parent BPSs (block pointer sets) and child BPSs, where each BPS includes an array of block pointers. Each child BPS is created as a copy of a parent BPS and has block pointers initially designated as copies. The technique performs a metadata-merge operation to merge the block pointers of the parent BPS into those of a child BPS by promoting attributes of block pointers in the child BPS from copy to source, avoiding any need to perform reference count updates on structures pointed to by promoted block pointers.

20 Claims, 7 Drawing Sheets

MERGING MAPPING METADATA TO PROMOTE REFERENCE COUNTING EFFICIENCY

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Data storage systems commonly employ metadata for mapping logical addresses of files or other data elements to corresponding physical addresses in a file system or volume. For example, a file system may provide a unique inode (index node) for each file that it stores, where each inode contains a file's attributes and some of its mapping data. Each inode may point to a set of indirect blocks (IBs), which map relative offsets into the respective file (logical addresses) to corresponding locations of data blocks (physical addresses) that store the file's data in an underlying volume. The mapping metadata thus organizes the file's blocks and allows the blocks to be laid out non-contiguously, or even randomly, in the underlying volume.

Many file systems support block sharing, where the mapping metadata of multiple files point to the same data blocks. Such block sharing is common in file systems that support snaps (point-in-time versions) and deduplication (removal of redundant data blocks). Some file systems also support sharing of IBs among multiple files. For example, files that have much of their data in common may use some or all of the same IBs to map their data. To keep track of IB sharing, each IB may have a reference count, which counts the number of block pointers that point to the respective IB. For mapping large files, IBs may be arranged in a multi-level tree, where first-level IBs include block pointers to second-level IBs, which may include block pointers to third-level IBs (leaf IBs), which point to data blocks.

With this arrangement, deletion of a file or a portion thereof triggers a series of activities to reclaim the file's unshared blocks, as such blocks may be returned to circulation for reuse elsewhere in the file system. When the file system issues a request to delete a file, it may follow a block pointer in the file's inode to an IB and then decrement the IB's reference count. If the decremented reference count becomes zero, the file system may reclaim the IB, as it is no longer being used anywhere in the file system. This action may cause a ripple effect for any IBs pointed to by the reclaimed IB, as their reference counts would also be decremented and would also be reclaimed if they fell to zero. These acts may be repeated for each IB pointed to by the file's inode.

SUMMARY

Unfortunately, the above-described approach to reclaiming IBs can be burdensome. For example, the practice of decrementing reference counts can involve large numbers of disk accesses to widely distributed storage locations. A typical IB as used in the prior approach may contain 1024 block pointers. If the reference count for the IB falls to zero, such that the IB will be reclaimed, the file system may have to visit all 1024 locations to decrement the reference counts of each of the pointed-to blocks. The operation can propagate further if the reference counts of any pointed-to blocks themselves go to zero. Decrementing reference counts can thus be an expensive and resource-intensive operation.

In contrast with prior approaches, an improved technique for managing metadata in a data storage system designates block pointers as either sources or copies. Block pointers designated as sources contribute to reference counts of pointed-to structures, whereas block pointers designated as copies do not. The improved technique also provides parent-child relationships between parent BPSs (block pointer sets) and child BPSs, where each BPS includes an array of block pointers mapping a range of logical addresses. Parent BPSs map data of logical address ranges, whereas child BPSs map data of logical copies of those logical address ranges, e.g., for supporting snaps or other fast copies. Each child BPS is created as a copy of a parent BPS and has block pointers initially designated as copies. Under certain conditions, the parent BPS may become inaccessible from a system namespace, such that it is no longer used for mapping any logical address range. Under such conditions, the improved technique performs a metadata-merge operation, to merge the block pointers of the parent BPS into those of a child BPS. The metadata-merge operation involves iterating over each source block pointer location in the parent BPS, testing a corresponding block pointer at the same location in the child BPS, and changing the corresponding block pointer in the child BPS to a source if it is currently designated as a copy. In this manner, the reference-counted source attributes of source block pointers in the parent BPS are transferred from the parent BPS to the child BPS for any pointed-to structures shared between the parent BPS and the child BPS. There is no need to perform any reference count updates for these transferred attributes, as the number of reference-counted source block pointers remains the same. A significant amount of expensive reference count processing is therefore avoided. A data storage system implementing the improved technique can thus operate much more efficiently than it could without it.

In some examples, the improved technique further includes a clean-up operation. The cleanup operation iterates over non-transferred source block pointers in the parent BPS, which may reflect differentiation of the child BPS from its parent after the child was created. For each non-transferred source block pointer, the technique may follow the pointer to the pointed-to structure, decrement its reference count, and free the pointed-to structure if its reference count becomes zero. Although reference count processing is still performed for these non-transferred source block pointers, the number of non-transferred source block pointers is generally small, such that processing reference counts for these pointers has little effect on overall efficiency. Also, reference count processing may often be deferred, such that the actions can be performed at opportune times.

In some examples, once all non-transferred source block pointers in the parent BPS are processed, the parent BPS may itself be reclaimed. Upon removal of the parent BPS, the parent-child relationship is adjusted to reflect the new relationship. For example, the child BPS may be promoted to a parent.

Certain embodiments are directed to a method of managing metadata in a data storage system. The method includes maintaining (i) a parent BPS (block pointer set) for mapping a base range of a storage object and (ii) a child BPS for mapping a logical copy of the base range. Each BPS includes multiple block pointers that map data of the respective range. Each block pointer has an attribute that indicates whether that block pointer is a source or a copy. The block pointers in the child BPS are initially designated as copies when the child BPS is created. The method further includes maintaining reference counts on lower-level mapping structures pointed to by the block pointers of the parent BPS and the child BPS. The reference count for each lower-level mapping structure counts a number of source block pointers pointing to that mapping structure and is unaffected by any copy block pointers that also point to that lower-level mapping structure. Subsequent to the parent BPS becoming inaccessible from a namespace of the data storage system, the method still further includes performing a metadata-merge operation between the parent BPS and the child BPS. The metadata-merge operation (i) updates each copy block pointer at a respective pointer location in the child BPS to a source, in response to a block pointer at the corresponding location in the parent BPS being a source, and (ii) invalidates, in the parent BPS, the block pointer corresponding to each updated block pointer in the child BPS. The metadata-merge operation thereby transfers reference-counted source attributes from the parent BPS to the child BPS without updating reference counts of lower-level mapping structures pointed to by the updated block pointers.

Other embodiments are directed to a data storage system constructed and arranged to perform a method of managing metadata, such as the method described above. Still other embodiments are directed to a computer program product. The computer program product stores instructions which, when executed by control circuitry of a data storage system, cause the data storage system to perform a method of managing metadata, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for managing metadata in a data storage system designates block pointers as either sources or copies, where sources contribute to reference counts of pointed-to structures but copies do not. The technique maintains parent-child relationships between parent BPSs (block pointer sets) and child BPSs, where each BPS includes an array of block pointers. Each child BPS is created as a copy of a parent BPS and has block pointers initially designated as copies. The technique performs a metadata-merge operation to merge the block pointers of the parent BPS into those of a child BPS by promoting attributes of block pointers in the child BPS from copy to source, avoiding any need to perform reference count updates on structures pointed to by promoted block pointers.

Figure 1:
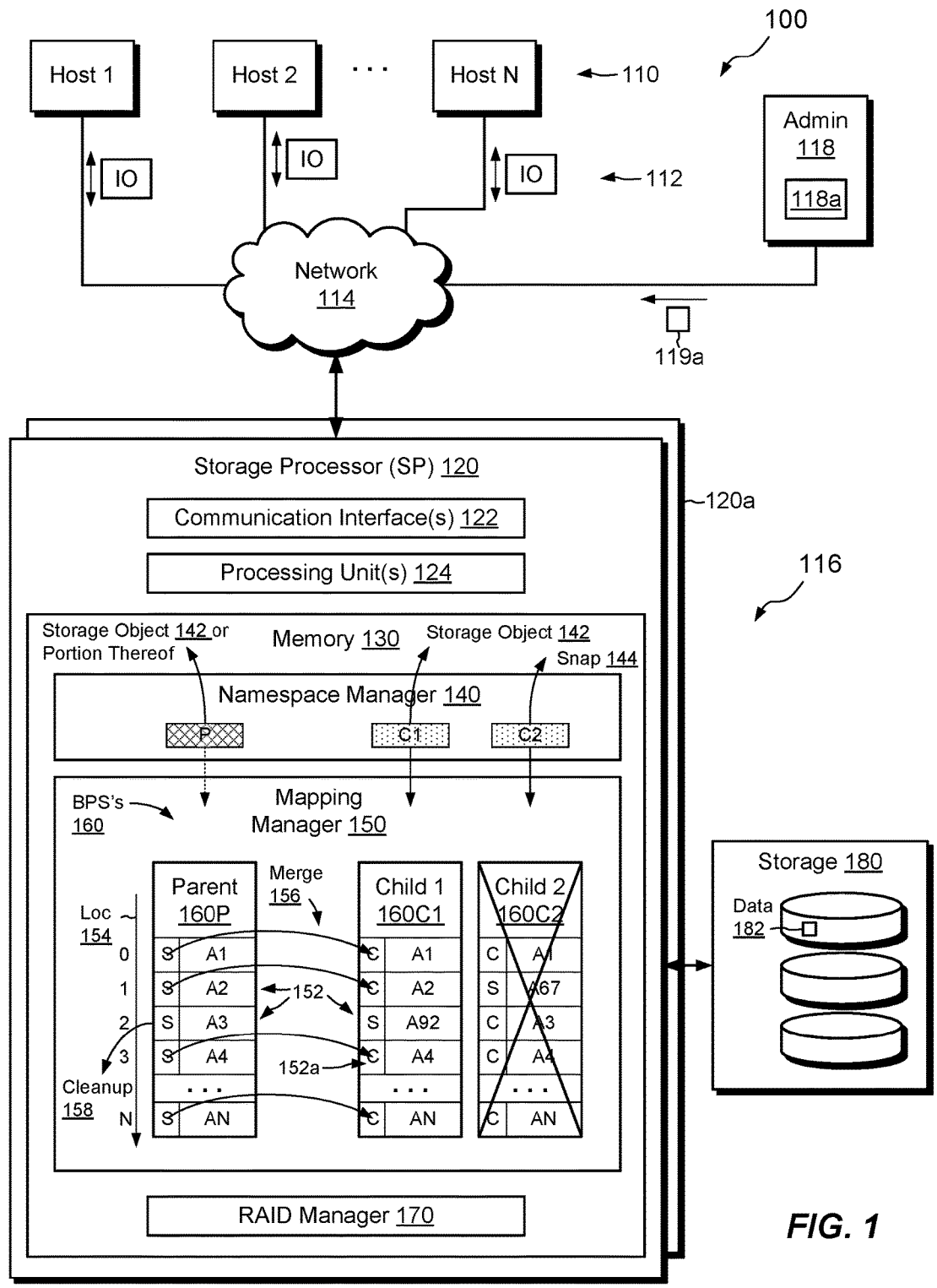
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and storage 180, such as magnetic disk drives, electronic flash drives, and the like. The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood that no particular hardware configuration is required, however, as any number of SPs may be provided, including a single SP, and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI (Internet small computer system interface), NFS (network file system), and CIFS (common Internet file system), for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

In some arrangements, an administrative machine 118 also connects to the data storage system 116 over the network 114. The administrative machine 118 runs an administrative program 118a, which may assist in configuring and managing the data storage system 116.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory, e.g., RAM (Random-Access Memory), and non-volatile memory, such as one or more ROMs (Read-Only Memory devices), magnetic disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a namespace manager 140, a mapping manager 150, and a RAID (Redundant Array of Independent Disks) manager 170. The namespace manager 140 maintains a namespace of storage objects accessible to hosts 110. For example, the namespace manager 140 exposes a storage object 142, which corresponds to a range "P" in a logical address space. Range P may be a range of contiguous logical addresses spanning some or all of a LUN (Logical storage UNit), VVOL (virtual machine volume), or file system, for example. The mapping manager 150 maps logical addresses maintained by the namespace manager 140 to corresponding RAID addresses, and the RAID manager 170 maps the RAID addresses to corresponding locations in storage 180. In the arrangement shown, data 182 depicts physical storage elements that back the range P.

In example operation, hosts 110 issue IO requests 112 to the data storage system 116, such as reads and writes directed to the storage object 142. The SP 120 receives the IO requests 112 at the communication interfaces 122 and initiates further processing. Such processing may include associating the reads and writes with logical addresses in the range P, mapping the logical addresses to RAID addresses, and directing storage devices (e.g., disk drives) in the storage 180 to execute the requested reads and writes on the data 182.

At some point during operation, a host 110 or the administrative program 118a may issue a request to create a logical copy of range P. For example, P may represent a LUN, and administrative program 118a may issue a request 119a to take a snap of the LUN. In response to the request 119a, the namespace manager 140 creates a logical copy C1 of P. Range C1 is a "logical copy" rather than a physical copy because range C1 initially refers to the same data 182 as range P. The two may diverge over time, however.

In a particular example, which should not be regarded as limiting, the request 119a is a request to the namespace manager 140 to perform a copy-copy-delete operation. The copy-copy-delete operation creates two logical copies C1 and C2 of range P (the "copy-copy" part) and proceeds to delete or otherwise invalidate range P from the logical address space (the delete part). As a result of the copy-copy-delete, range C1 supports the host-accessible object 142, such that the namespace manager 142 directs IO requests 112 addressed to the storage object 142 to range C1. Range C2 supports a snap 144. Ranges C1 and C2 are initially identical in size to range P and point to the same data 182.

The mapping manager 150 performs the required mapping that initially points ranges P, C1, and C2 to data 182. As shown, mapping manager 150 includes BPS's (block pointer sets) 160. Each BPS includes an array of block pointers 152 that store locations of lower-level pointing structures or of data. Block pointer sets may also be referred to herein as "logicals." Each block pointer 152 in a BPS 160 includes a source/copy attribute 152a (S or C), which identifies the block pointer 152 as either a source or a copy. Also, the mapping manager 150 arranges BPS's into families. Here, a parent BPS 160P is a parent and two child BPS's 160C1 and 160C2 are children of the parent BPS 160P. Parent BPS 160P maps range P, child BPS 160C1 maps copy range C1, and child BPS 160C2 maps copy range C2.

During the copy-copy-delete operation, the mapping manager 150 creates the child BPS's 160C1 and 160C2 as copies of parent BPS 160P and initially sets the source/copy attributes 152a of all block pointers 152 in both 160C1 and 160C2 to "copy." The source/copy attributes 152a in the parent BPS 160P stay as they were prior to the copy-copy-delete. Some of these parent attributes may be sources and others may be copies, e.g., depending on whether the parent BPS 160P is itself a child of some grandparent BPS (not shown). Additional information about block pointer sets may be found in copending U.S. patent application Ser. No. 14/674,608, filed Mar. 31, 2015, the contents and teachings of which are incorporated herein by reference in their entirety.

As shown, the mapping manager 150 retains the parent BPS 160P even after the copy-copy-delete operation has removed the corresponding range P from the namespace. Parent BPS 160P may thus be regarded as "orphaned," as it continues to exist, e.g., for metadata consistency, but is no longer pointed to by any host-accessible object in the namespace.

Source/copy attributes 152a participate in reference count management. For example, each block pointer stores an address (A1, A2, etc.) of a lower-level BPS or other data structure, which has a respective reference count. Each reference count of a pointed-to structure counts only the number of source block pointers that point to that structure and is unaffected by any number of copy block pointers that may also point to that structure. For example, if the zeroth block pointer of BPS 160P (a source block pointer) points to a structure at address A1, and no other source block pointers point to that structure at A1, then the reference count for that structure would be one, even if a hundred copy block pointers also point to that structure. The term "source block pointer" as used herein describes a block pointer 152 having a source/copy attribute 152a set to "source," whereas the term "copy block pointer" as used herein describes a block pointer 152 having a source/copy attribute 152a set to "copy."

At some point after the copy-copy-delete operation has completed, an action may be performed that severs a parent-child relationship between the parent BPS 160P and one of the child BPS's 160C1 or 160C2. For example, a host 112 or an administrator may delete snap 144, such that the namespace manager 140 removes range C2. Alternatively, hosts 110 may overwrite snap 144 so that it becomes entirely distinct from object 142 and shares no data with object 142.

Either of these acts results in child BPS 160C2 no longer being a child of parent BPS 160P or a sibling of child BPS 160C1.

In an example, this severing of the parent-child relationship creates an opportunity to reclaim parent BPS 160P as well as any unused downstream structures. In an example, the mapping manager 150 responds to severing of the parent-child relationship by initiating a metadata-merge operation 156. The metadata merge operation 156 transferred reference-counted source attributes held by the parent BPS 160P to the child BPS 160C1, such that the child BPS 160C1 holds the reference-counted attributes instead of the parent BPS 160P. To perform the metadata-merge operation 156, the mapping manager 150 iterates over each location 154 of block pointers 152 in the parent BPS 160P and compares each source block pointer to a corresponding block pointer at the same location 154 in the child BPS 160C1. If the corresponding block pointer in the child BPS 160C1 is a copy block pointer, the metadata-merge operation 156 changes the copy attribute in the child block pointer from copy to source, thereby vesting the reference-counted attribute in the child BPS 160P. The source block pointer whose source attribute 152a was transferred is then invalidated, so that only the child BPS 160C1 holds the source attribute. Once the metadata-merge operation 156 is complete, all the copy block pointers in the child BPS 160C1 that match corresponding source block pointers in the parent BPS 160P have been changed from copy to source.

One should appreciate that the transfer effected by the metadata-merge operation 156 preserves reference count information while requiring no updates to reference counts in the pointed-to structures. It is therefore not required to visit each and every location pointed-to by the block pointers 152 in the parent BPS 160P and update a reference count. Avoiding this requirement saves a tremendous amount of processing and disk access, as it is no longer necessary to read and modify large numbers of blocks at diverse storage locations. Indeed, the update is fairly easy to perform, as it typically affects only two blocks, i.e., the one storing the parent BPS 160P and the one storing the child BPS 160C1.

In some circumstances, a cleanup operation 158 may accompany the metadata-merge operation 156. The cleanup operation 158 typically follows the metadata-merge operation 156, although the order of these operations can be exchanged.

One should appreciate that a small number of reference count updates may still be needed before the parent BPS 160P becomes unnecessary. For example, a block pointer in the child BPS 160C1 may have changed to reflect an overwrite. Such an example can be seen at location 2, where the block pointer in the parent BPS 160P points to A3 but the block pointer at the corresponding location of BPS 160C1 is a source that points to A92. As there are no remaining child BPS's in this example other than child BPS 160C1, the block pointer at location 2 of the parent BPS 160P is unique. But since parent BPS 160P is an orphan, this block pointer no longer points to active data and can be removed.

Cleanup operation 158 may proceed by following each source block pointer in BPS 160P that was not transferred to child BPS 160C1 and decrementing the reference count of the pointed-to structure. If the reference count of the pointed-to structure goes to zero, the structure may be reclaimed. Also, lower-level structures pointed-to by the structure to be reclaimed may have their respective reference counts decremented, and may be reclaimed accordingly.

At the conclusion of the clean-up operation 158, the parent BPS 160P may itself be reclaimed, provided that its reference count is zero. Also, parent-child relationships may be mended appropriately to account for any reclaimed BPS's.

Figure 2A:
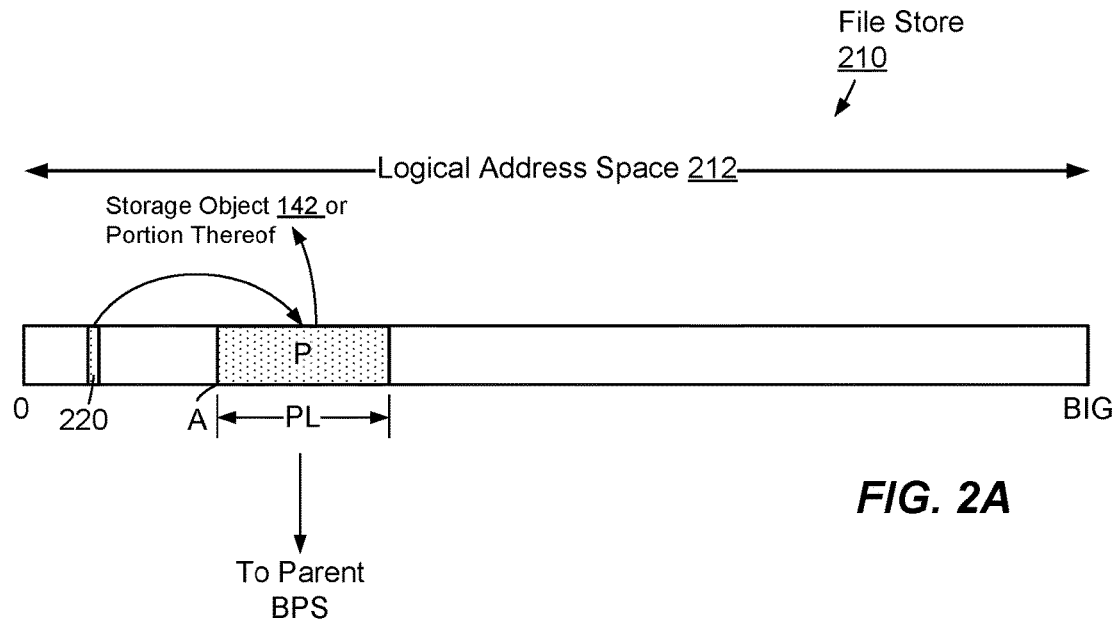
FIGS. 2A and 2B are block diagrams of an example sequence for performing a copy-copy-delete operation in a namespace of a data storage system.
Figure 2B:
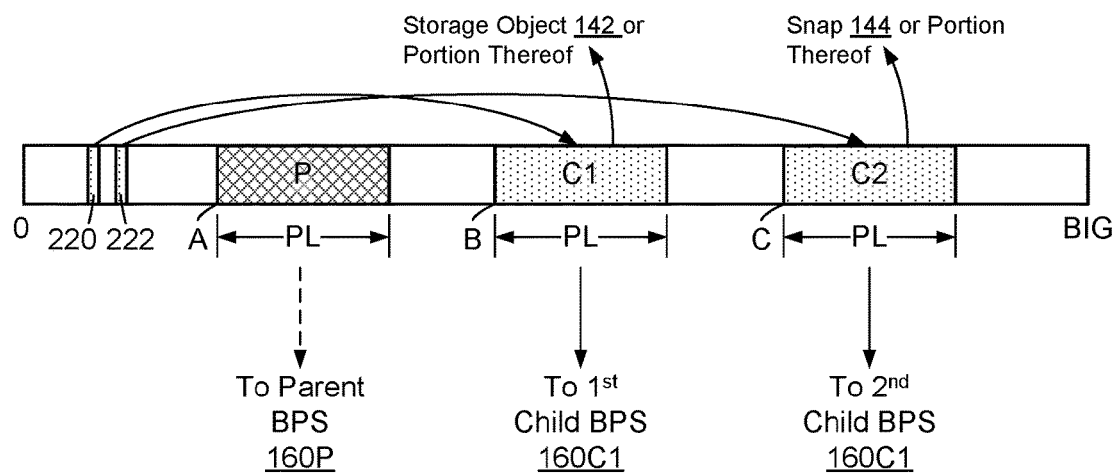

FIGS. 2A and 2B show an example arrangement for performing a copy-copy-delete operation by the namespace manager 140. As shown in FIG. 2A, a file store 210 has a logical address space 212, which may extend, for example, from zero to a very large number, such as 8 Exabytes, and which organizes storage for both data and metadata.

FIG. 2A depicts an example arrangement prior to the copy-and-delete operation. Here, range 220 provides logical space for an inode (index node) of storage object 142. The inode corresponding to range 220 stores attributes of storage object 142 and points to the range P, which organizes storage of the object 142 itself. For example, the inode at 220 stores a starting address A in address range 212 and a corresponding length PL, which identifies a size of the object 142. Although not shown in the figure, the mapping manager 150 maps each logical address in range P to corresponding locations in storage elements 182 (FIG. 1). One should appreciate that the file store 210 may manage logical addresses only and may contain no structure for mapping logical addresses to corresponding physical addresses. Rather, it may be the role of the mapping manager 150 to map logical addresses in the file store 210 to corresponding physical addresses, such as RAID addresses.

FIG. 2B depicts an example arrangement after the copy-copy-delete operation has been performed. As shown, the copy-copy-delete operation has created two logical copies of range P, i.e., range C1 and range C2 (see also FIG. 1). To create the logical copies, the file store 210 may change the inode at 220 to point to logical address B instead of logical address A, such that the inode points to C1 rather than to P. The file store may also allocate a new inode range 222, which points to logical address C, where range C2 begins. Range C1 may then provide logical addressing for the storage object 142, while range C2 may provide logical addressing for the snap 144.

The mapping manager 150 (FIG. 1) maps each logical address in range P to the parent BPS 160P, even though range P is no longer host-accessible. The mapping manager 150 also maps each logical address in ranges C1 and C2 to child BPS's 160C1 and 160C2, respectively. One should appreciate that multiple BPS's may be required to map range P and each of ranges C1, and C2, depending on the size of such ranges.

Figure 3:
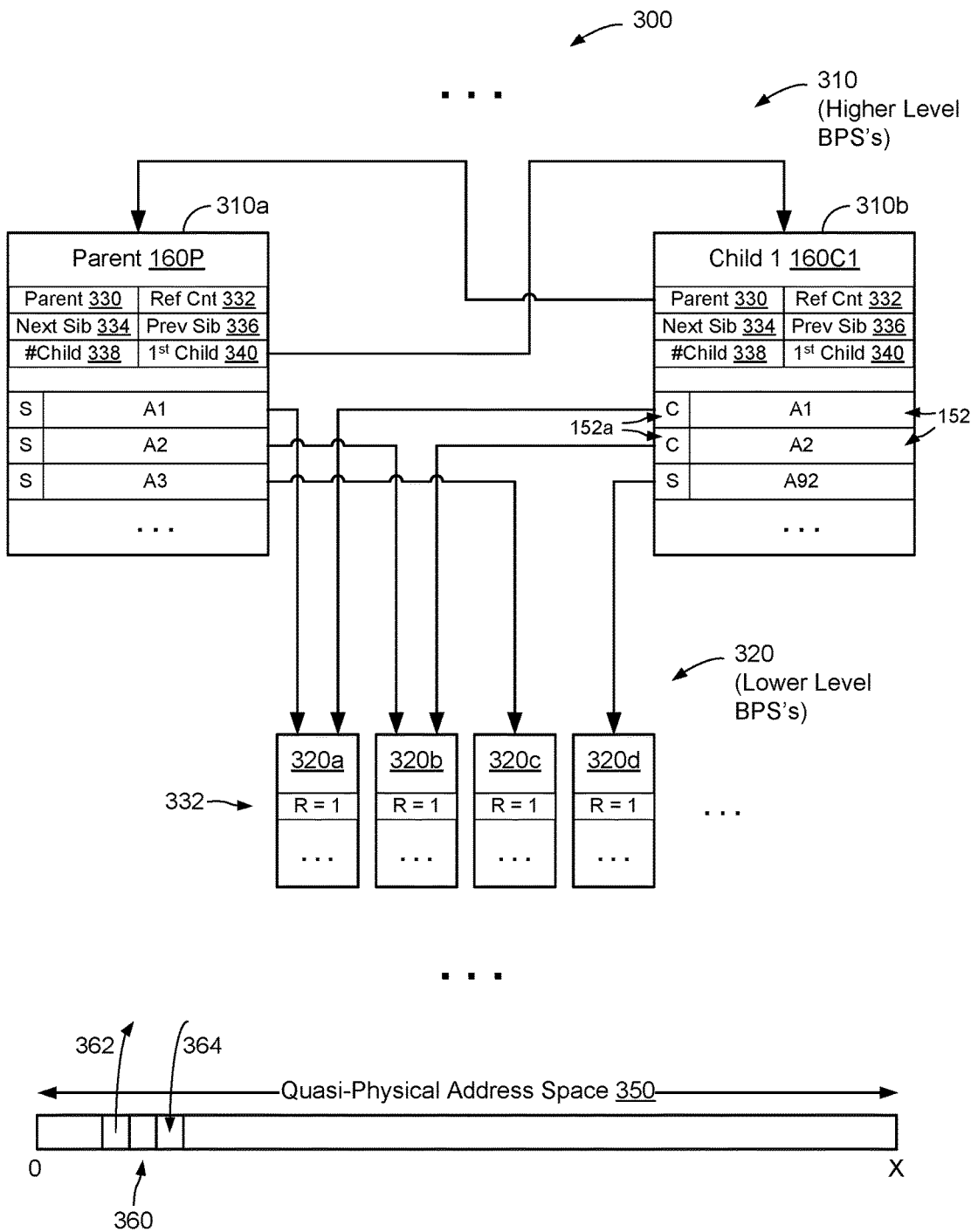
FIG. 3 shows an example arrangement of a parent BPS (block pointer set) and a child BPS, where the parent BPS and the child BPS share some lower-level BPS's but not others.

FIG. 3 shows an example of the parent BPS 160P and first child BPS 160C1 in additional detail. For purposes of this example, it is assumed that the second child BPS 160C2 is no longer a child of parent BPS 160P or a sibling of child BPS 160C1. For example, second child BPS 160C2 may have been deleted, e.g., consequent to deletion of the snap 144, or may have become distinct from parent BPS 160C1, e.g., as a result of overwrites. Also, it is assumed that no metadata-merge operation 156 or cleanup operation 158 has yet been performed.

As shown, the parent BPS 160P and the child BPS 160C1 each include, in addition to block pointers 152, a set of attributes, such as the following:

Parent 330: A location of a parent of the current BPS, if there is one. A parent of one BPS may also be a child of another BPS.

Reference Count 332: A count of the number of source block pointers that point to the current BPS, regardless of any number of copy block pointers that also point to the current BPS.

Next Sibling 334: A location of a next sibling BPS, which is another child of the parent BPS, which is identified in attribute 330. Sibling BPS's may be arranged in a doubly-linked list, such that all siblings may be located given the location of any one sibling.

Previous Sibling 336: A location of a previous sibling BPS in the doubly-linked list of siblings of the current BPS.

Children 338: A count of the number of child BPS's of the current BPS.

1$^{st}$ Child 340: A location of a first child BPS of the current BPS, which is generally the first child BPS to be created. Once the first child BPS is found, other child BPS's may also be found by following the sibling pointers.

In the example of FIG. 3, parent BPS 160P has no parent or siblings, so attributes 330, 334, and 336 are all empty. As parent BPS 160P is an orphan, its reference count attribute 332 is zero. Its #children 338 is one (as BPS 160C1 is now the only child), and its 1$^{st}$ child attribute 340 points to child BPS 160C1.

As for child BPS 160C1, its parent attribute 330 points to parent BPS 160P and its sibling pointers 334 and 336 are blank. Its #Children attribute 338 and 1$^{st}$ Child attribute 340 are also blank in this case, as child BPS 160C1 itself has no children. The reference count 338 of child BPS 160C1 may be one, to reflect the fact that range C1 in the file store 210 points to BPS 160C1.

As further shown in FIG. 3, BPS's may be arranged in a BPS tree 300, in which higher-level BPS's 310 have block pointers 152 that point to lower-level BPS's 320. Here, parent BPS 160P is a higher-level BPS 310a that has a first block pointer to A1 that points to a lower-level BPS 320a. A second block pointer of BPS 160P to A2 points to lower-level BPS 320b, and a third block pointer to A3 points to lower-level BPS 310c.

As further shown, child BPS 160C1 is a higher-level BPS 310b, which has block pointers to A1 and A2 pointing to lower-level BPS's 320a and 320b, respectively. BPS 160C1 also has a block pointer to A92 that points to lower-level BPS 320d.

In the example shown, each of the lower-level BPS's 320a through 320d has a reference count attribute 332 set to one (R=1), as each such BPS has only a single source block pointer pointing to it. This is the case even though BPS's 320a and 320b each have a copy block pointer also pointing to them (reference count attribute 332 responds only to the number of source block pointers).

The BPS tree 300 may be an extremely large structure. For example, each BPS 160 may provide a large number of block pointers, such as 512. Thus, each higher-level BPS 310 can point to 512 lower-level BPS's 320. One or more additional levels may be provided below the lower-level BPS's 320, causing the BPS tree 300 to expand even further (e.g., by another factor of 512). In addition, the higher-level BPS's 310 need not be the highest level of BPS's; e.g., there may be one or more additional levels of BPS's pointing to the BPS's 310. Although lower-level BPS's 320 are shown in condensed form, one should appreciate that these BPS's may include all the same attributes 332, 332, 334, 336, 338, and 340 as described above in connection with the higher-level BPS's 310.

In a particular example, the mapping manager 150 may store each BPS 160 in a respective block, where each block is a unit of allocatable storage, which may be 4 KB in size, for example. Other block sizes may be used. Thus, each BPS 160 or logical may be implemented as a single indirect block (IB). In the example shown, blocks for storing BPS's are arranged in a quasi-physical address space 350, which may be provided as a volume, for example. The mapping manager 150 may allocate (362) blocks from the quasi-physical address space 350 to create new BPS's 160. It may also de-allocate (364) blocks when BPS's 160 are reclaimed, such that they may be reused for other purposes. The address space 350 is referred to as "quasi-physical" because there may be mapping layers (or other kinds of layers) below the address space 350 to efficiently support their storage.

Figure 4:
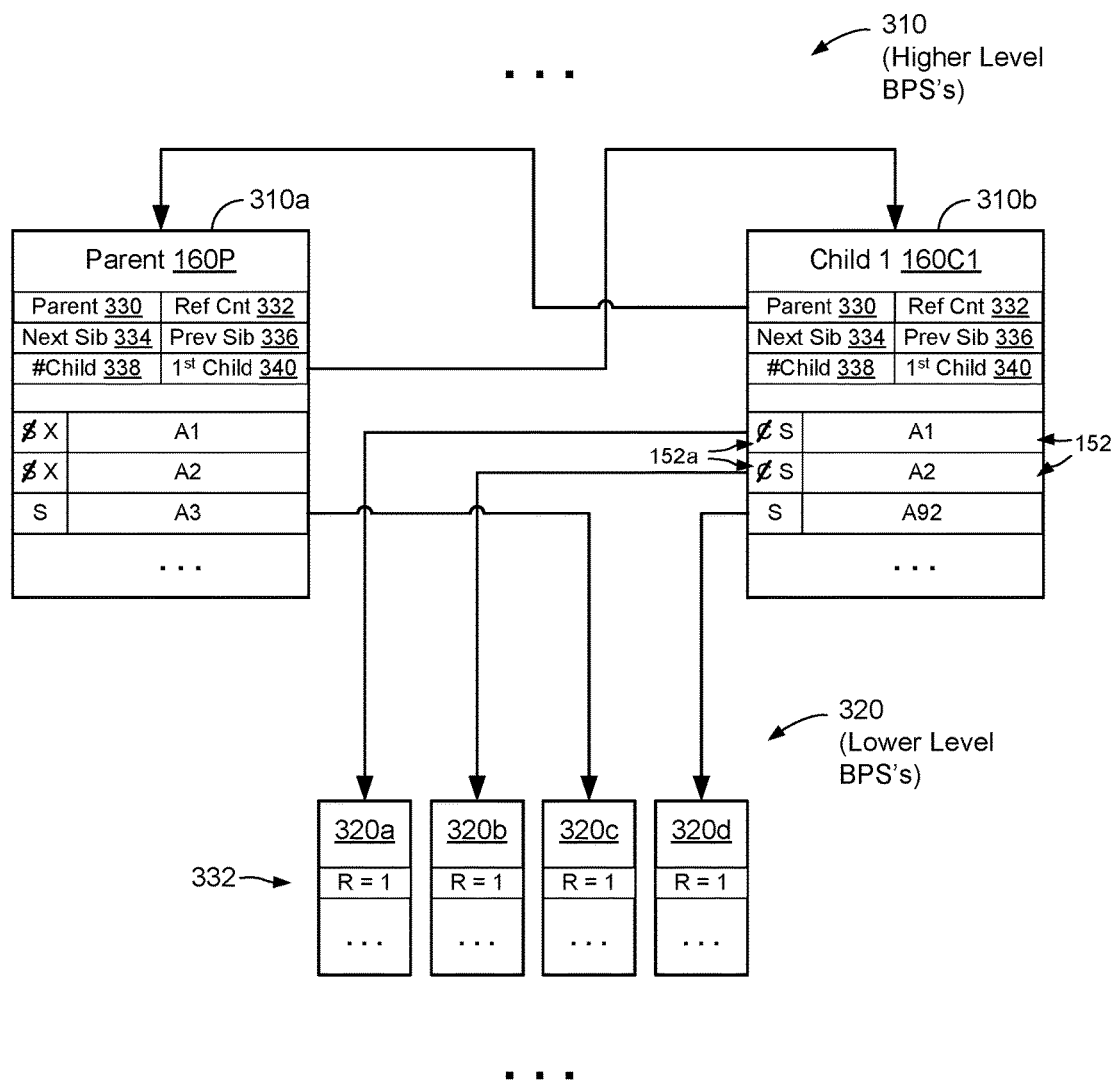
FIG. 4 shows the arrangement of FIG. 3 after performance of an example metadata-merge operation.

FIG. 4 shows the same arrangement as in FIG. 3, but after the metadata-merge operation 156 has been completed. Here, source attributes of block pointers for A1 and A2 in parent BPS 160P have been transferred to the block pointers for A1 and A2 in child BPS 160C1 (i.e., at the corresponding locations 154). The source attributes 152a at the transferred locations of parent BPS 160P have been invalidated (marked with X's). Block pointers 152 for A3 in BPS 160P and for A92 in BPS 160C1 are unaffected. Also, reference counts 332 of lower-level BPS's 320 are unaffected. Indeed, there is generally no reason for the metadata-merge operation 156 to access lower-level BPS's 320.

Figure 5:
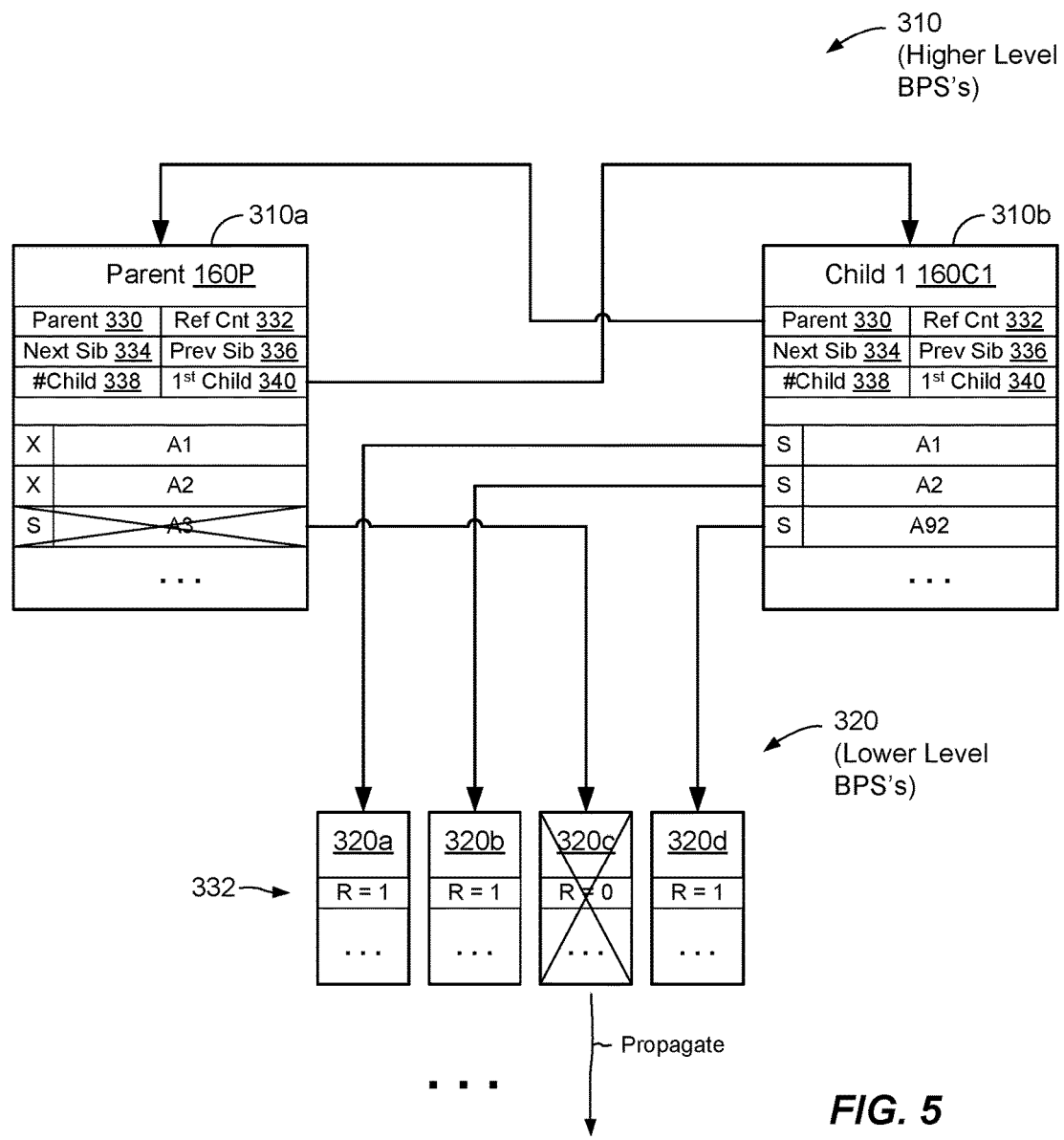
FIG. 5 shows the arrangement of FIGS. 3 and 4, partway through an example clean-up operation.

FIG. 5 shows the same arrangement as in FIG. 4, but after a portion of the cleanup operation 158 has been performed. Here, the cleanup operation 158 has identified unique source block pointers in parent BPS 160P whose source attributes where not transferred during the metadata-merge operation 156, e.g., because the block pointer at the corresponding location in the child BPS 160C1 was a source and pointed to a different address. The block pointer to A3 in BPS 160P is an example of a unique source block pointer. Because parent BPS 160P is an orphan and there are no child BPS's that also point to A3, the pointer to A3 in BPS 160P serves no useful purpose and may be deleted or otherwise invalidated. In addition, the reference count 332 of the pointed-to structure 320c may be decremented. As shown, the reference 332 of BPS 320c has fallen to zero.

The occurrence of the reference count of BPS 320c falling to zero may trigger a reclaim operation that propagates recursively down the BPS tree 300. Reclaim of BPS 320c is possible because the reference count 332 falling to zero means that no other objects point to it, so BPS 320c is no longer needed. If BPS 320c has no children, the mapping manager 150 may perform another cleanup operation 158 on BPS 320c and then reclaim the block that contains it, thus returning the block to circulation, If BPS 320c has only one child BPS's, the metadata manager 150 may perform a metadata merge operation 156 between BPS 320c and its only child and then perform a cleanup operation 158. Eventually, the entire tree structure supporting parent BPS 160P may be reclaimed, as may the parent BPS 160P itself.

Figure 6:
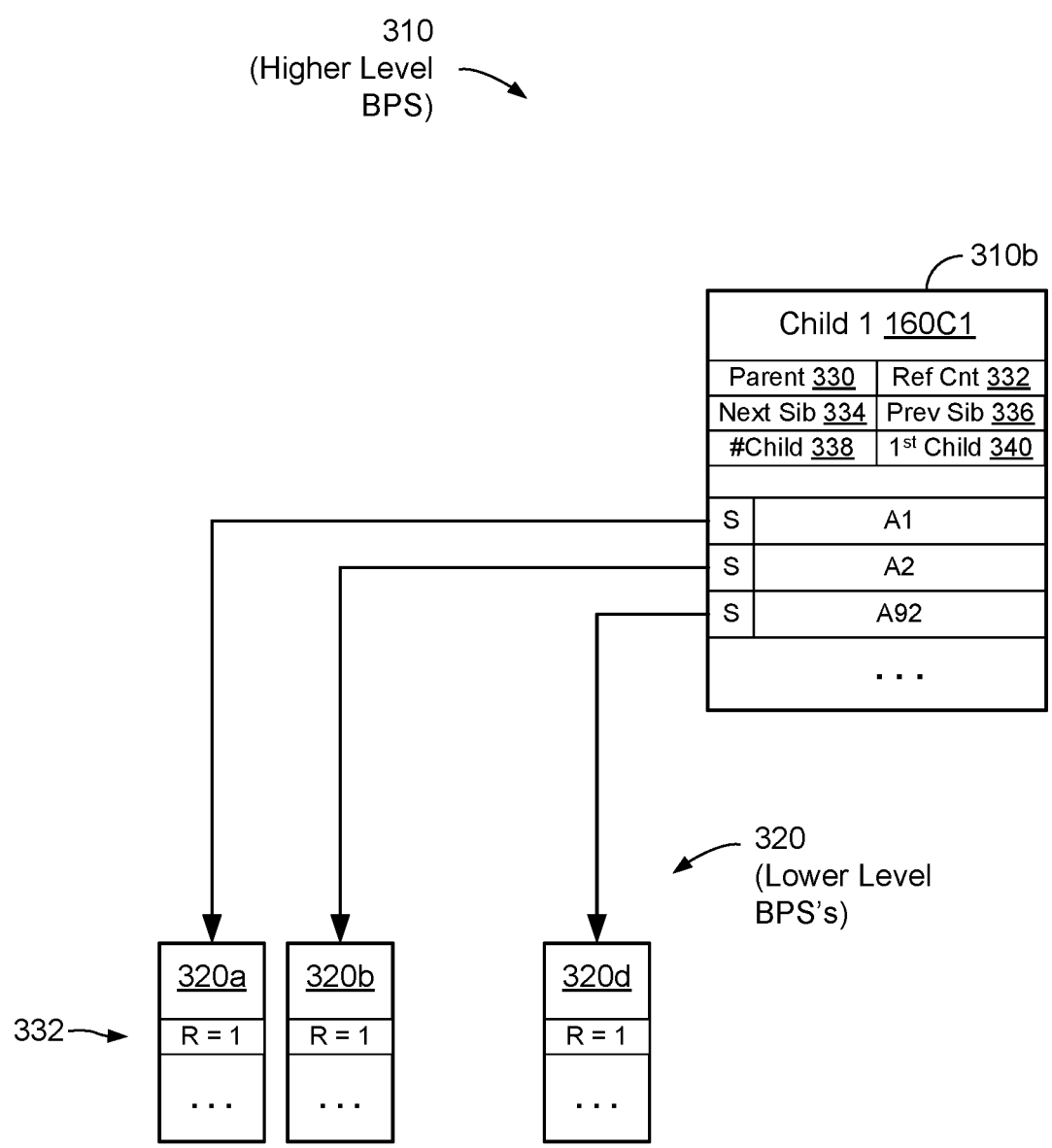
FIG. 6 shows the arrangement of FIGS. 3-5, at a later stage of the example cleanup operation.

An example result of the cleanup operation 158 is shown in FIG. 6. Here, parent BPS 160P and its underlying structure have been reclaimed and no longer appear. Child BPS 160C1 remains; however, its parent attribute 330 no longer points to parent BPS 160P, effectively making child BPS 160C1 a parent. Deletion of the parent BPS 160P is only possible because its reference count 332 has fallen to zero and its source attributes have been merged with the remaining child.

Figure 7:
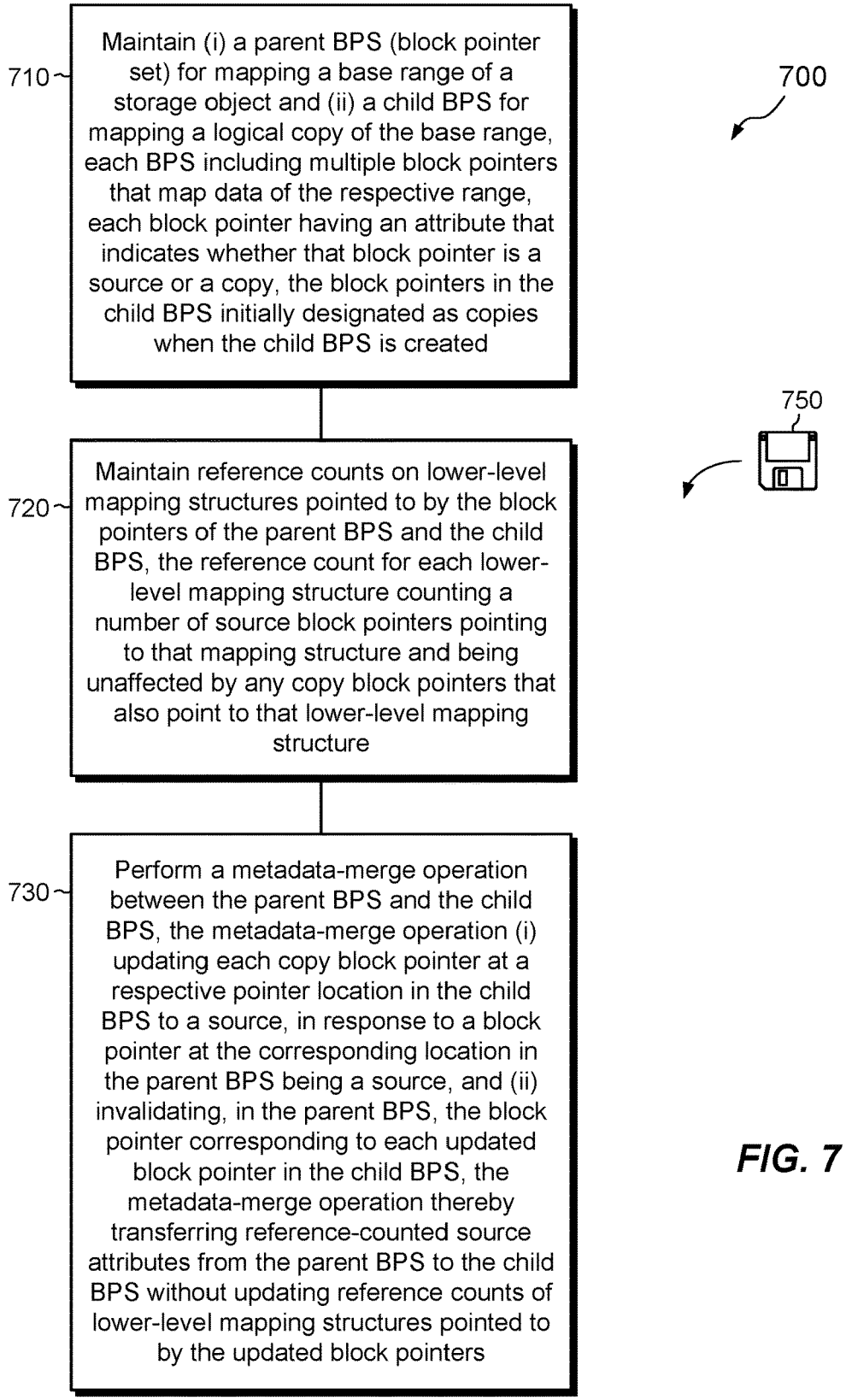
FIG. 7 is a flowchart showing an example method of managing metadata.

FIG. 7 shows an example method 700 that may be carried out in connection with the environment 100. The method 700 is typically performed, for example, by the software constructs described in connection with FIG. 1, which reside in the memory 130 of the storage processor 120 and are run by the set of processors 124. The various acts of the method 700 may be ordered in any suitable way. Accordingly, embodiments may be constructed in which acts are performed in orders different from that illustrated, which may include performing some acts simultaneously.

At 710, a parent BPS (block pointer set) 160P is maintained for mapping a base range P of a storage object 142. A child BPS 160C1 is also maintained for mapping a logical copy C1 of the base range P. Each BPS 160P and 160C1 includes multiple block pointers 152 that map data 182 of the respective range. Each block pointer 152 has an attribute 152a that indicates whether that block pointer is a source (S) or a copy (C). The block pointers 152 in the child BPS 160C1 are initially designated as copies when the child BPS 160C1 is created.

At 720, reference counts 332 are maintained on lower-level mapping structures 320 pointed to by the block pointers 152 of the parent BPS 160P and the child BPS 160C1. The reference count 332 for each lower-level mapping structure 320 counts a number of source block pointers pointing to that mapping structure 320 and is unaffected by any copy block pointers that also point to that lower-level mapping structure 320.

At 730, a metadata-merge operation 156 is performed between the parent BPS 160P and the child BPS 160C1. The metadata-merge operation 156 (i) updates each copy block pointer 152 at a respective pointer location 154 in the child BPS 160C1 to a source, in response to a block pointer at the corresponding location 154 in the parent BPS 160P being a source, and (ii) invalidates, in the parent BPS 160P, the block pointer corresponding to each updated block pointer in the child BPS 160C1. The metadata-merge operation 156 thereby transfers reference-counted source attributes 152a from the parent BPS 160P to the child BPS 160C1 without updating reference counts 332 of lower-level mapping structures 320 pointed to by the updated block pointers.

Having described certain embodiments, numerous alternative embodiments or variations can be made. For example, although embodiments have been described that involve a copy-copy-delete operation, these are merely examples, as embodiments may also be constructed whenever there is a parent BPS and a child BPS, regardless of how that arrangement arises.

Also, embodiments have been described in which a metadata-merge operation 156 is performed when there is only a single remaining child BPS 160C1 of a parent BPS 160P. This is also merely an example, as substantially the same activities may be conducted even when the parent BPS 160P has multiple child BPS's.

Further, embodiments have been described in connection with a particular namespace manager 140, which organizes data and metadata in a single logical address space 212. This is merely an example, however, as the principles hereof also apply in systems that treat logical addresses differently, including conventional Windows, Unix, and Linux file systems, or any operating system that shares resources. Embodiments hereof are therefore not limited to any particular logical namespace or logical addressing structure.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing metadata in a data storage system, the method comprising:

maintaining (i) a parent BPS (block pointer set) for mapping a base range of a storage object and (ii) a child BPS for mapping a logical copy of the base range, each BPS including multiple block pointers that map data of the respective range, each block pointer having an attribute that indicates whether that block pointer is a source or a copy, the block pointers in each child BPS initially designated as copies when that child BPS is created;

maintaining reference counts on lower-level mapping structures pointed to by the block pointers of the parent BPS and the child BPS, the reference count for each lower-level mapping structure counting a number of source block pointers pointing to that mapping structure and being unaffected by any copy block pointers that also point to that lower-level mapping structure; and subsequent to the parent BPS becoming inaccessible from a namespace of the data storage system, performing a metadata-merge operation between the parent BPS and the child BPS, the metadata-merge operation (i) updating each copy block pointer at a respective pointer location in the child BPS to a source, in response to a block pointer at the corresponding location in the parent BPS being a source, and (ii) invalidating, in the parent BPS, the block pointer corresponding to each updated block pointer in the child BPS, the metadata-merge operation thereby transferring reference-counted source attributes from the parent BPS to the child BPS without updating reference counts of lower-level mapping structures pointed to by the updated block pointers.

2. The method of claim 1, wherein the parent BPS is part of a parent BPS tree that includes the parent BPS and multiple lower-level BPS's that provide lower-level mapping structures of the parent BPS, and wherein the block pointers in the parent BPS point to the lower-level BPS's in the parent BPS tree.

3. The method of claim 2, wherein the child BPS is a sole child BPS of the parent BPS, such that the parent BPS has no other child BPS's.

4. The method of claim 3, further comprising performing a cleanup operation, the cleanup operation including:
identifying a set of unique source block pointers in the parent BPS, which are not invalidated by the metadata-merge operation; and
for each of the set of unique source block pointers, decrementing the reference count of a respective lower-level BPS pointed to by that unique source block pointer.

5. The method of claim 4, wherein performing the cleanup operation further includes, in response to the decremented reference count of a lower-level BPS indicating zero references, freeing that lower-level BPS such that it is no longer used to map the base range.

6. The method of claim 4, wherein the child BPS has a parent field configured to store a quasi-physical address of the parent BPS, and wherein performing the cleanup operation further includes:
freeing the parent BPS such that it is no longer used to map the base range; and
deleting or otherwise invalidating the quasi-physical address of the parent BPS from the parent field of the child BPS.

7. The method of claim 1,
wherein the child BPS is a first child BPS created along with a second child BPS as part of a copy-copy-delete operation that created the first and second child BPS's and orphaned the parent BPS, such that the parent BPS became inaccessible from a namespace of the data storage system, and
wherein the metadata-merge operation is performed in response to a parent-child relationship being severed between the parent BPS and the second child BPS.

8. The method of claim 7, the parent-child relationship is severed between the parent BPS and the second child BPS in response to one of (i) the second child BPS being deleted or (ii) the second child BPS being entirely overwritten.

9. The method of claim 1, further comprising:
providing the parent BPS in a first block of a quasi-physical address space of the data storage system; and
providing the child BPS in a second block of the quasi-physical address space,
wherein each of the first block and the second block includes:
(i) multiple block pointer fields, each block pointer field configured to store an address in the quasi-physical address space of a pointed-to structure and an attribute field configured to identify the block pointer as a source or a copy;
(ii) a reference count field configured to indicate a number of source block pointers that point to the respective block;
(iii) a parent field configured to identify a quasi-physical address of another BPS from which the BPS in the respective block was copied; and
(iv) at least one child field configured to identify a quasi-physical address of another BPS that was created as a copy of the BPS in the respective block.

10. A data storage system, comprising control circuitry that includes a set of processing units coupled to memory, the control circuitry constructed and arranged to:
maintain (i) a parent BPS (block pointer set) for mapping a base range of a storage object and (ii) a child BPS for mapping a logical copy of the base range, each BPS including multiple block pointers that map data of the respective range, each block pointer having an attribute that indicates whether that block pointer is a source or a copy, the block pointers in each child BPS initially designated as copies when that child BPS is created;
maintain reference counts on lower-level mapping structures pointed to by the block pointers of the parent BPS and the child BPS, the reference count for each lower-level mapping structure counting a number of source block pointers pointing to that mapping structure and being unaffected by any copy block pointers that also point to that lower-level mapping structure; and
subsequent to the parent BPS becoming inaccessible from a namespace of the data storage system, perform a metadata-merge operation between the parent BPS and the child BPS, the metadata-merge operation (i) updating each copy block pointer at a respective pointer location in the child BPS to a source, in response to a block pointer at the corresponding location in the parent BPS being a source, and (ii) invalidating, in the parent BPS, the block pointer corresponding to each updated block pointer in the child BPS, the metadata-merge operation thereby transferring reference-counted source attributes from the parent BPS to the child BPS without updating reference counts of lower-level mapping structures pointed to by the updated block pointers.

11. The data storage system of claim 10, wherein the control circuitry constructed and arranged to:
provide the parent BPS in a first block of a quasi-physical address space of the data storage system; and
provide the child BPS in a second block of the quasi-physical address space,
wherein each of the first block and the second block includes:
(i) multiple block pointer fields, each block pointer field configured to store an address in the quasi-physical address space of a pointed-to structure and an attribute field configured to identify the block pointer as a source or a copy;
(ii) a reference count field configured to indicate a number of source block pointers that point to the respective block;
(iii) a parent field configured to identify a quasi-physical address of another BPS from which the BPS in the respective block was copied; and
(iv) at least one child field configured to identify a quasi-physical address of another BPS that was created as a copy of the BPS in the respective block.

12. A computer program product including a set of non-transitory, computer-readable media having instructions which, when executed by control circuitry of a data storage system, cause the control circuitry to perform a method of managing metadata, the method comprising:

maintaining (i) a parent BPS (block pointer set) for mapping a base range of a storage object and (ii) a child BPS for mapping a logical copy of the base range, each BPS including multiple block pointers that map data of the respective range, each block pointer having an attribute that indicates whether that block pointer is a source or a copy, the block pointers in each child BPS initially designated as copies when that child BPS is created;

maintaining reference counts on lower-level mapping structures pointed to by the block pointers of the parent BPS and the child BPS, the reference count for each lower-level mapping structure counting a number of source block pointers pointing to that mapping structure and being unaffected by any copy block pointers that also point to that lower-level mapping structure; and subsequent to the parent BPS becoming inaccessible from a namespace of the data storage system, performing a metadata-merge operation between the parent BPS and the child BPS, the metadata-merge operation (i) updating each copy block pointer at a respective pointer location in the child BPS to a source, in response to a block pointer at the corresponding location in the parent BPS being a source, and (ii) invalidating, in the parent BPS, the block pointer corresponding to each updated block pointer in the child BPS, the metadata-merge operation thereby transferring reference-counted source attributes from the parent BPS to the child BPS without updating reference counts of lower-level mapping structures pointed to by the updated block pointers.

13. The computer program product of claim 12, wherein the parent BPS is part of a parent BPS tree that includes the parent BPS and multiple lower-level BPS's that provide lower-level mapping structures of the parent BPS, and wherein the block pointers in the parent BPS point to the lower-level BPS's in the parent BPS tree.

14. The computer program product of claim 13, wherein the child BPS is a sole child BPS of the parent BPS, such that the parent BPS has no other child BPS's.

15. The computer program product of claim 14, wherein the method further comprises performing a cleanup operation, the cleanup operation including:
    identifying a set of unique source block pointers in the parent BPS, which are not invalidated by the metadata-merge operation; and
    for each of the set of unique source block pointers, decrementing the reference count of a respective lower-level BPS pointed to by that unique source block pointer.

16. The computer program product of claim 15, wherein performing the cleanup operation further includes, in response to the decremented reference count of a lower-level BPS indicating zero references, freeing that lower-level BPS such that it is no longer used to map the base range.

17. The computer program product of claim 15, wherein the child BPS has a parent field configured to store a quasi-physical address of the parent BPS, and wherein performing the cleanup operation further includes:
    freeing the parent BPS such that it is no longer used to map the base range; and
    deleting or otherwise invalidating the quasi-physical address of the parent BPS from the parent field of the child BPS.

18. The computer program product of claim 12,
    wherein the child BPS is a first child BPS created along with a second child BPS as part of a copy-copy-delete operation that created the first and second child BPS's and orphaned the parent BPS, such that the parent BPS became inaccessible from a namespace of the data storage system, and
    wherein the metadata-merge operation is performed in response to a parent-child relationship being severed between the parent BPS and the second child BPS.

19. The computer program product of claim 18, the parent-child relationship is severed between the parent BPS and the second child BPS in response to one of (i) the second child BPS being deleted or (ii) the second child BPS being entirely overwritten.

20. The computer program product of claim 12, wherein the method further comprises:
    providing the parent BPS in a first block of a quasi-physical address space of the data storage system; and
    providing the child BPS in a second block of the quasi-physical address space,
    wherein each of the first block and the second block includes:
        (i) multiple block pointer fields, each block pointer field configured to store an address in the quasi-physical address space of a pointed-to structure and an attribute field configured to identify the block pointer as a source or a copy;
        (ii) a reference count field configured to indicate a number of source block pointers that point to the respective block;
        (iii) a parent field configured to identify a quasi-physical address of another BPS from which the BPS in the respective block was copied; and
        (iv) at least one child field configured to identify a quasi-physical address of another BPS that was created as a copy of the BPS in the respective block.

* * * * *